J. W. WIGHT.
Sled Brake.

No. 72,708. Patented Dec. 24, 1867.

Witnesses:

Inventor.

United States Patent Office.

JOSIAH W. WIGHT, OF CHICAGO, ILLINOIS.

Letters Patent No. 72,708, dated December 24, 1867.

IMPROVED SLED-BRAKE.

The Schedule referred to in these Letters Patent and making part of the same.

TO ALL WHOM IT MAY CONCERN:

Be it known that I, JOSIAH W. WIGHT, of Chicago, in the county of Cook, and State of Illinois, have invented a new and useful Improved Sled-Brake; and I do hereby declare that the following is a full, clear, and exact description of the same, reference being had to the accompanying drawings, and the letters and figures marked thereon, which form a part of this specification, and in which—

Figure 1:
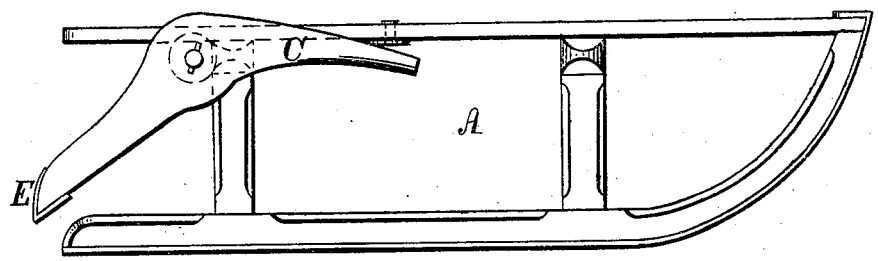

Figure 1 represents a side elevation of my invention, and

Figure 2:
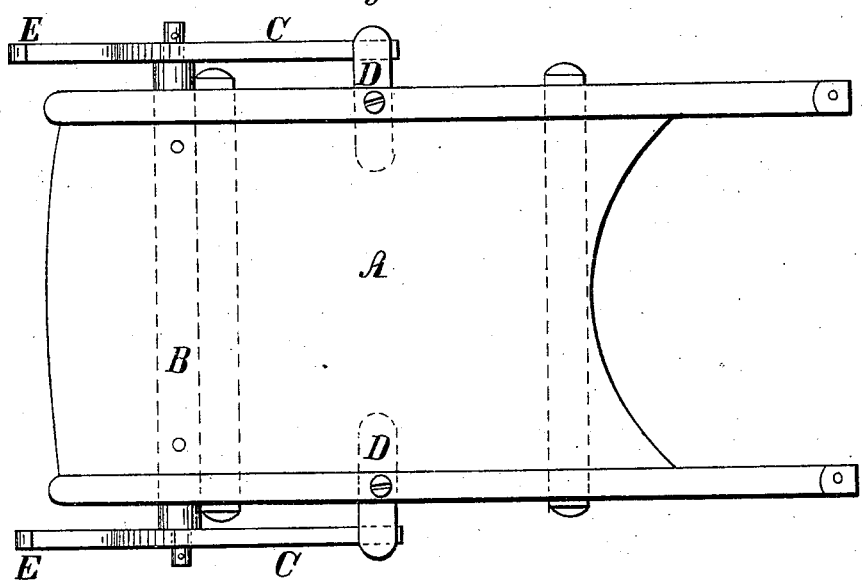

Figure 2 a top or plan view.

The nature of my invention consists in a novel attachment to a sled, whereby the person on the sled is enabled to turn the sled in either direction, or stop it, as he may desire.

To enable those skilled in the art to manufacture and use my invention, I will proceed to describe the same with particularity.

The same letters of reference in the drawings represent the corresponding parts in the different figures.

A represents an ordinary boy's coasting-sled, and B represents a piece put across the sled, with its ends extending out at the sides thereof, said piece B being firmly fastened to the sled. C is the brake, which is pivoted to the ends of the cross-piece B. There are buttons, D, attached to the sled in such a way that they may be turned out over the ends of the brakes C to hold them up, as shown, when not in use.

When the boy wishes to turn or stop his sled, he turns the buttons D, and taking hold of the brakes throws their ends, E, down on to the snow and ice. The ends, E, may be covered with metal to make them more durable. Instead of having a separate cross-piece, B, the rear sled-beam may be used, the brakes being attached to it similar to the way they are shown attached to the cross-piece.

Having thus fully described the construction and operation of my improved sled-brake, what I claim as my invention, and desire to secure by Letters Patent, is—

The brakes C, in combination with a sled, A, when constructed and operating substantially as and for the purposes herein described.

JOSIAH W. WIGHT.

Witnesses:
L. L. COBURN,
W. E. MARRS.